(12) United States Patent
Tokuda et al.

(10) Patent No.: US 12,025,829 B2
(45) Date of Patent: Jul. 2, 2024

(54) RESIN COMPOSITION, OPTICAL FIBER AND METHOD FOR PRODUCING OPTICAL FIBER

(71) Applicant: SUMITOMO ELECTRIC INDUSTRIES, LTD., Osaka (JP)

(72) Inventors: Chiaki Tokuda, Osaka (JP); Katsushi Hamakubo, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 410 days.

(21) Appl. No.: 17/295,914

(22) PCT Filed: Jun. 8, 2020

(86) PCT No.: PCT/JP2020/022501
§ 371 (c)(1),
(2) Date: May 21, 2021

(87) PCT Pub. No.: WO2020/255774
PCT Pub. Date: Dec. 24, 2020

(65) Prior Publication Data
US 2022/0017768 A1    Jan. 20, 2022

(30) Foreign Application Priority Data

Jun. 17, 2019 (JP) .................................. 2019-112037

(51) Int. Cl.
*G02B 6/02* (2006.01)
*C03C 25/1065* (2018.01)
(Continued)

(52) U.S. Cl.
CPC ...... *G02B 6/02395* (2013.01); *C03C 25/1065* (2013.01); *C03C 25/285* (2013.01);
(Continued)

(58) Field of Classification Search
None
See application file for complete search history.

(56) References Cited

U.S. PATENT DOCUMENTS

| 4,525,026 | A | * | 6/1985 | Elion | ....................... H01B 7/28 385/128 |
| 2008/0045623 | A1 | * | 2/2008 | Yamaguchi | ........... C03C 25/106 522/90 |

(Continued)

FOREIGN PATENT DOCUMENTS

| CN | 105440782 A | 3/2016 |
| JP | 2000-007717 A | 1/2000 |

(Continued)

*Primary Examiner* — Jerry Rahll
(74) *Attorney, Agent, or Firm* — Faegre Drinker Biddle & Reath LLP

(57) ABSTRACT

A resin composition for coating an optical fiber comprises: a base resin containing a photopolymerizable compound and a photopolymerization initiator; and hydrophobic inorganic oxide particles, wherein the photopolymerizable compound comprises urethane (meth)acrylate and aliphatic epoxy (meth)acrylate, and the content of the aliphatic epoxy (meth)acrylate is 1.0% by mass or more and 45% by mass or less based on the total amount of the photopolymerizable compound.

7 Claims, 1 Drawing Sheet

(51) Int. Cl.
*C03C 25/285* (2018.01)
*C03C 13/04* (2006.01)
*C03C 25/105* (2018.01)
*C03C 25/326* (2018.01)
*C08F 220/32* (2006.01)
*C08F 220/36* (2006.01)
*C08K 3/36* (2006.01)
*C09D 4/00* (2006.01)
*C09D 7/61* (2018.01)
*C09D 133/14* (2006.01)

(52) U.S. Cl.
CPC ............ *C03C 13/04* (2013.01); *C03C 25/105* (2013.01); *C03C 25/326* (2013.01); *C03C 2213/00* (2013.01); *C08F 220/325* (2020.02); *C08F 220/36* (2013.01); *C08F 2800/20* (2013.01); *C08K 3/36* (2013.01); *C09D 4/00* (2013.01); *C09D 7/61* (2018.01); *C09D 133/14* (2013.01)

(56) References Cited

U.S. PATENT DOCUMENTS

2010/0329617 A1* 12/2010 Bulters ............... C03C 25/1065
　　　　　　　　　　　　　　　　　　　　　　　522/96
2017/0242187 A1　8/2017　Iwaguchi et al.
2020/0216714 A1* 7/2020 Hamakubo ........ C08G 18/7621

FOREIGN PATENT DOCUMENTS

| JP | 2004-045828 A | | 2/2004 |
| JP | 2004045828 | * | 2/2004 |
| JP | 2014-219550 A | | 11/2014 |
| JP | 2016-098127 A | | 5/2016 |
| WO | WO-2017/065274 A1 | | 4/2017 |

* cited by examiner

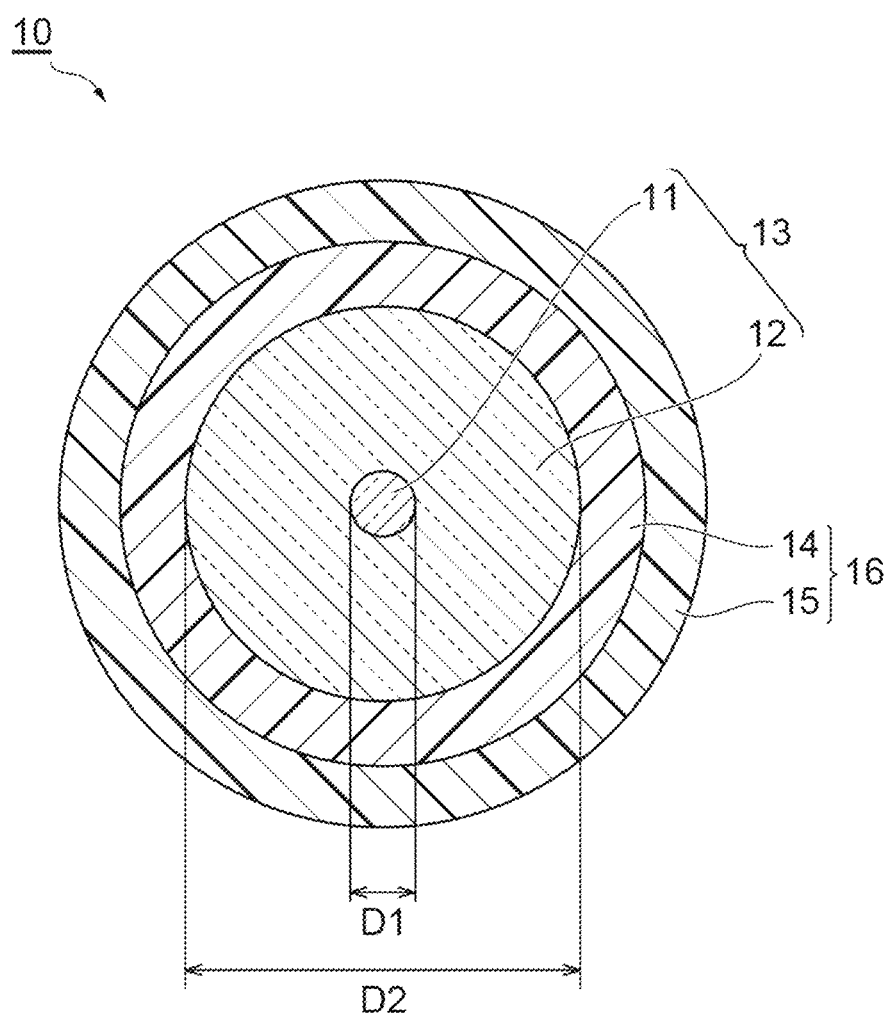

RESIN COMPOSITION, OPTICAL FIBER AND METHOD FOR PRODUCING OPTICAL FIBER

TECHNICAL FIELD

The present disclosure relates to a resin composition, an optical fiber, and a method for manufacturing an optical fiber.

This application claims priority based on Japanese Patent Application No. 2019-112037 filed on Jun. 17, 2019, and incorporates all the contents described in the Japanese application.

BACKGROUND ART

An optical fiber has a coating resin layer for protecting a glass fiber that is an optical transmission medium. The coating resin layer generally comprises a primary resin layer and a secondary resin layer. In order to reduce an increase in transmission loss induced by micro-bend generated when lateral pressure is applied to the optical fiber, the optical fiber has been required to have excellent lateral pressure characteristics.

In Patent Literature 1, improvement in the lateral pressure characteristics of the optical fiber is investigated by incorporating a filler into the outermost layer of the coating resin layer.

CITATION LIST

Patent Literature

[Patent Literature 1] JP 2014-219550 A

SUMMARY OF INVENTION

A resin composition according to an aspect of the present disclosure comprises: a base resin comprising a photopolymerizable compound and a photopolymerization initiator; and hydrophobic inorganic oxide particles, wherein the photopolymerizable compound comprises urethane (meth)acrylate and aliphatic epoxy (meth)acrylate, and the content of the aliphatic epoxy (meth)acrylate is 1.0% by mass or more and 45% by mass or less based on the total amount of the photopolymerizable compound.

BRIEF DESCRIPTION OF DRAWING

FIG. 1 is a schematic cross-section diagram showing an example of the optical fiber according to the present embodiment.

DESCRIPTION OF EMBODIMENTS

Problem to be Solved by the Present Disclosure

The secondary resin layer containing a filler has a high Young's modulus and therefore is hardly affected by lateral pressure, but the toughness tends to decrease. Therefore, the secondary resin layer is required to have excellent toughness while maintaining a high Young's modulus.

An object of the present disclosure is to provide a resin composition capable of having both high Young's modulus and toughness, and an optical fiber comprising a secondary resin layer formed from the resin composition.

Effect of the Present Disclosure

The present disclosure can provide: a resin composition capable of having both high Young's modulus and toughness; and an optical fiber comprising the secondary resin layer formed from the resin composition.

Description of Embodiments of the Present Disclosure

First, the contents of the embodiment of the present disclosure will be described by listing them. A resin composition according to an aspect of the present disclosure comprises: a base resin comprising a photopolymerizable compound and a photopolymerization initiator; and hydrophobic inorganic oxide particles, wherein the photopolymerizable compound comprises urethane (meth)acrylate and aliphatic epoxy (meth)acrylate, and the content of the aliphatic epoxy (meth)acrylate is 1.0% by mass or more and 45% by mass or less based on the total amount of the photopolymerizable compound.

Such a resin composition can form a secondary resin layer capable of having both high Young's modulus and toughness as a resin composition for coating an optical fiber.

In order to further increase the toughness of the secondary resin layer, aliphatic epoxy (meth)acrylate may have an ethylene oxide group or a propylene oxide group.

In order to impart appropriate toughness to the secondary resin layer, the photopolymerizable compound may further comprise epoxy (meth)acrylate having an aromatic ring.

Due to excellent dispersion properties in the resin composition and easy adjustment of Young's modulus, the inorganic oxide particles may be particles including at least one selected from the group consisting of silicon dioxide, zirconium dioxide, aluminum oxide, magnesium oxide, titanium oxide, tin oxide, and zinc oxide.

The optical fiber according to an aspect of the present disclosure comprises a glass fiber comprising a core and a cladding, a primary resin layer being in contact with the glass fiber and coating the glass fiber, and a secondary resin layer coating the primary resin layer, wherein the secondary resin layer comprises a cured product of the above resin composition. Accordingly, the lateral pressure characteristics and the toughness of the optical fiber can be improved.

A method for manufacturing the optical fiber according to an aspect of the present disclosure comprises: an application step of applying the above resin composition to the outer periphery of a glass fiber composed of a core and a cladding; and a curing step of curing the resin composition by irradiating with ultraviolet rays after the application step. This can produce an optical fiber having improved lateral pressure characteristics and toughness.

Detail of Embodiment of the Present Disclosure

Specific examples of a resin composition and an optical fiber according to the embodiment of the present disclosure will be described referring to the drawing as necessary. The present invention is not limited to these illustrations but is indicated by the claims and intended to include meanings equivalent to the claims and all modifications within the claims. In the following description, the same reference numerals are given to the same elements in the description of the drawing, and redundant explanations are omitted.

<Resin Composition>

The resin composition according to the present embodiment comprises: a base resin comprising a photopolymerizable compound and a photopolymerization initiator; and hydrophobic inorganic oxide particles.

(Base Resin)

The photopolymerizable compound according to the present embodiment comprises urethane (meth)acrylate and aliphatic epoxy (meth)acrylate. (Meth)acrylate means an acylate or a methacrylate corresponding to it. The same applies to (meth)acrylic acid.

As urethane (meth)acrylate, an oligomer obtained by reacting a polyol compound, a polyisocyanate compound, and a hydroxyl group-containing (meth)acrylate compound can be used. The urethane (meth)acrylate has a urethane structure based on a reaction between a polyol compound and a polyisocyanate compound, and a (meth)acryloyl group bonded to a terminal of the urethane structure.

Examples of the polyol compound include polytetramethylene glycol, polypropylene glycol and bisphenol A-ethylene oxide addition diol. Examples of the polyisocyanate compound include 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl (meth)acrylate, 2-hydroxybutyl (meth)acrylate, 1,6-

An oligomer obtained by reacting a compound having a (meth)acryloyl group such as (meth)acrylic acid with an aliphatic epoxy compound having two or more glycidyl groups can be used as aliphatic epoxy (meth)acrylate. The aliphatic epoxy (meth)acrylate is an epoxy (meth)acrylate having no aromatic ring.

In order to further increase the toughness of the secondary resin layer, it is preferable that the aliphatic epoxy (meth)acrylate have an ethylene oxide (EO) group or a propylene oxide (PO) group. Examples of the aliphatic epoxy (meth)acrylate include a (meth)acrylic acid adduct of propylene glycol diglycidyl ether, a (meth)acrylic acid adduct of polypropylene glycol diglycidyl ether, a (meth)acrylic acid adduct of ethylene glycol diglycidyl ether, and a (meth)acrylic acid adduct of polyethylene glycol diglycidyl ether.

A compound represented by the following formula (1) or (2) may be used as the aliphatic epoxy (meth)acrylate. In the formula, $R^1$ and $R^2$ each independently represent a hydrogen atom or a methyl group, and n and m each independently represent 0 or an integer of 1 or more. n and m may be an integer of 1 or more and 10 or less, an integer of 1 or more and 9 or less, or an integer of 2 or more and 9 or less.

[Chemical Formula 1]

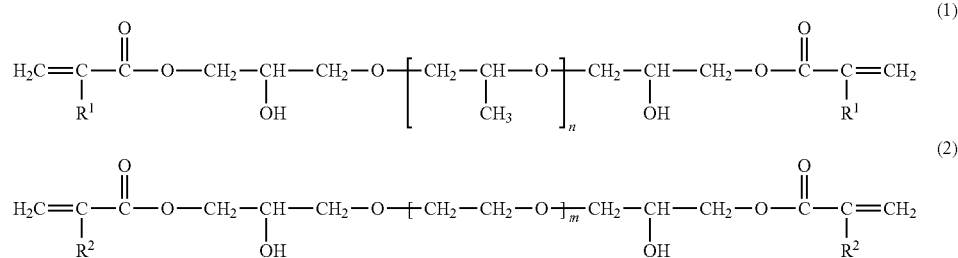

hexanediol mono(meth)acrylate, pentaerythritol tri(meth)acrylate, 2-hydroxypropyl (meth)acrylate, and tripropylene glycol mono(meth)acrylate.

From the viewpoint of adjusting the Young's modulus of the resin layer, the number average molecular weight (Mn) of the polyol compound is preferably 300 or more and 4000 or less, more preferably 400 or more and 3000 or less, and further preferably 500 or more and 2500 or less.

As a catalyst for synthesizing urethane (meth)acrylate, an organotin compound is generally used. Examples of the organotin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. From the viewpoint of easy availability or catalyst performance, it is preferable that dibutyltin dilaurate or dibutyltin diacetate be used as catalyst.

When urethane (meth)acrylate is synthesized, lower alcohols having 5 or less carbon atoms may be used. Examples of the lower alcohols include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

The content of the urethane (meth)acrylate may be 1% by mass or more and 30% by mass or less, 5% by mass or more and 20% by mass or less, or 10% by mass or more and 15% by mass or less based on the total amount of the photopolymerizable compound.

Examples of commercially available products of the aliphatic epoxy (meth)acrylate include trade names "epoxy ester 40EM", "epoxy ester 70PA", "epoxy ester 200PA", and "epoxy ester 80MFA" manufactured by Kyoeisha Chemical Co., Ltd.

In order to impart flexibility to the resin layer and achieve both high Young's modulus and toughness, the content of the aliphatic epoxy (meth)acrylate is 1.0% by mass or more and 45% by mass or less, preferably 1.5% by mass or more and 40% by mass or less, more preferably 3% by mass or more and 35% by mass or less, and further preferably 4% by mass or more and 32% by mass or less based on the total amount of the photopolymerizable compound.

Due to excellent balance between Young's modulus and toughness, the photopolymerizable compound may further comprise an epoxy (meth)acrylate having an aromatic ring. An oligomer obtained by reacting a compound having a (meth)acryloyl group such as (meth)acrylic acid with an aromatic epoxy compound having two or more glycidyl groups can be used as an epoxy (meth)acrylate having an aromatic ring. Examples of the epoxy (meth)acrylate having an aromatic ring include a (meth)acrylic acid adduct of bisphenol A diglycidyl ether. The content of the epoxy (meth)acrylate having an aromatic ring may be 10% by mass or more and 50% by mass or less, 20% by mass or more and 45% by mass or less, or 30% by mass or more and 45% by mass or less based on the total amount of the photopolymerizable compound.

In the present description, the urethane (meth)acrylate and the epoxy (meth)acrylate used as the photopolymerizable compound may be collectively referred to as "oligomer". The photopolymerizable compound according to the present embodiment may further include a photopolymerizable compound other than an oligomer (hereinafter, also referred to as "monomer").

At least one selected from the group consisting of the monofunctional monomer having one photopolymerizable group and the multifunctional monomer having two or more photopolymerizable groups can be used as the monomer. A monomer may be used by mixing two or more monomers.

Examples of the monofunctional monomer include (meth)acrylate monomers such as methyl (meth)acrylate, ethyl (meth)acrylate, propyl (meth)acrylate, n-butyl (meth)acrylate, sec-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, 2-phenoxyethyl (meth)acrylate, 3-phenoxybenzyl acrylate, phenoxydiethylene glycol acrylate, phenoxypolyethylene glycol acrylate, 4-tert-butylcyclohexanol acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate, nonylphenoxypolyethylene glycol (meth)acrylate, and isobornyl (meth)acrylate; carboxyl group containing monomers such as (meth)acrylic acid, (meth)acrylic acid dimer, carboxyethyl (meth)acrylate, carboxypentyl (meth)acrylate, and ω-carboxy-polycaprolactone (meth)acrylate; heterocycle containing monomers such as N-(meth)acryloyl morpholine, N-vinyl pyrrolidone, N-vinyl caprolactam, N-acryloylpiperidine, N-methacryloylpiperidine, N-(meth)acryloylpyrrolidine, 3-(3-pyridine) propyl (meth)acrylate, and cyclic trimethylolpropane formal acrylate; maleimide monomers such as maleimide, N-cyclohexyl maleimide, and N-phenyl maleimide; amide monomers such as (meth)acrylamide, N, N-dimethyl (meth)acrylamide, N, N-diethyl (meth)acrylamide, N-hexyl (meth)acrylamide, N-methyl (meth)acrylamide, N-isopropyl (meth)acrylamide, N-butyl (meth)acrylamide, N-methylol (meth)acrylamide, and N-methylolpropane (meth)acrylamide; aminoalkyl (meth)acrylate monomers such as aminoethyl (meth)acrylate, aminopropyl (meth)acrylate, N, N-dimethylaminoethyl (meth)acrylate, and tert-butylaminoethyl (meth)acrylate; and succinimide monomers such as N-(meth)acryloyloxymethylene succinimide, N-(meth)acryloyl-6-oxyhexamethylene succinimide, and N-(meth)acryloyl-8-oxyoctamethylene succinimide.

Examples of the multifunctional monomer include: monomers having two polymerizable groups such as ethylene glycol di(meth)acrylate, polyethylene glycol di(meth)acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, hydroxypivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecanediol di(meth)acrylate, 1,20-eicosanediol di(meth)acrylate, isopentyldiol di(meth)acrylate, 3-ethyl-1,8-octanediol di(meth)acrylate, and EO adduct of bisphenol A di(meth)acrylate; and monomers having three or more polymerizable groups such as trimethylolpropane tri(meth)acrylate, trimethyloloctane tri(meth)acrylate, trimethylolpropane polyethoxy tri(meth)acrylate, trimethylolpropane polypropoxy tri(meth)acrylate, trimethylolpropane polyethoxy polypropoxy tri(meth)acrylate, tris[(meth)acryloyloxyethyl]isocyanurate, pentaerythritol tri(meth)acrylate, pentaerythritol polyethoxy tetra(meth)acrylate, pentaerythritol polypropoxy tetra(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, and caprolactone-modified tris[(meth)acryloyloxyethyl] isocyanurate.

The photopolymerization initiator can be appropriately selected from known radical photopolymerization initiators and used. Examples of the photopolymerization initiator include 1-hydroxycyclohexyl phenyl ketone (Omnirad 184, manufactured by IGM Resins), 2,2-dimethoxy-2-phenylacetophenone, 1-(4-isopropylphenyl)-2-hydroxy-2-methylpropan-1-one, bis(2,6-dimethoxybenzoyl)-2,4,4-trimethylpentylphosphine oxide, 2-methyl-1-[4-(methylthio)phenyl]-2-morpholino-propan-1-one (Omnirad 907 manufactured by IGM Resins), 2,4,6-trimethylbenzoyldiphenylphosphine oxide (Omnirad TPO manufactured by IGM Resins), and bis(2,4,6-trimethylbenzoyl) phenylphosphine oxide (Omnirad 819, manufactured by IGM Resins).

The content of the photopolymerization initiator is preferably 0.2% by mass or more and 6.0% by mass or less, more preferably 0.4% by mass or more and 3.0% by mass or less, and further preferably 0.6% by mass or more and 2.0% by mass or less based on the total amount of the photopolymerizable compound.

The resin composition may further contain a silane coupling agent, a leveling agent, an antifoaming agent, an antioxidant, a sensitizer, and the like.

The silane coupling agent is not particularly limited as long as it does not disturb curing of the resin composition. Examples of the silane coupling agent include tetramethyl silicate, tetraethyl silicate, mercaptopropyl trimethoxysilane, vinyltrichlorosilane, vinyltriethoxysilane, vinyltris(β-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl]disulfide, γ-trimethoxysilylpropyldimethylthiocarbamyl tetrasulfide, and γ-trimethoxysilylpropyl benzothiazyl tetrasulfide.

(Inorganic Oxide Particles)

The inorganic oxide particles according to the present embodiment have a surface subjected to hydrophobic treatment. The hydrophobic treatment according to the present embodiment is introduction of a hydrophobic group onto the surface of the inorganic oxide particles. The inorganic oxide particles having a hydrophobic group introduced have excellent dispersion properties in the resin composition. The hydrophobic group may be a reactive group such as a (meth)acryloyl group or a vinyl group, or a non-reactive group such as an aliphatic hydrocarbon group (for example, an alkyl group) or an aromatic hydrocarbon group (for example, a phenyl group). In the case of the inorganic oxide particles having a reactive group, the resin layer having high Young's modulus is easy to form.

The inorganic oxide particles according to the present embodiment are dispersed in a dispersion medium. Using the inorganic oxide particles dispersed in the dispersion medium allows for uniform dispersion of the inorganic oxide particles in the resin composition and then improvement of the storage stability of the resin composition. The dispersion medium is not particularly limited as long as curing of the resin composition is not obstructed. The dispersion medium may be reactive or non-reactive.

A monomer such as a (meth)acryloyl compound and an epoxy compound can be used as the reactive dispersion medium. Examples of the (meth)acryloyl compound include 1,6-hexanediol di(meth)acrylate, EO-modified bisphenol A di(meth)acrylate, polyethylene glycol di(meth)acrylate, PO-modified bisphenol A di(meth)acrylate, polypropylene glycol di(meth)acrylate, and polytetramethylene glycol di(meth)acrylate. Compounds exemplified by monomers described above may be used as the (meth)acryloyl compound.

A ketone solvent such as methyl ethyl ketone (MEK), an alcohol solvent such as methanol (MeOH), or an ester solvent such as propylene glycol monomethyl ether acetate (PGMEA) may be used as a non-reactive dispersion medium. In the case of the non-reactive dispersion medium, the resin composition may be prepared by mixing the base resin and the inorganic oxide particles dispersed in the dispersion medium and removing a part of the dispersion medium.

The inorganic oxide particles dispersed in the dispersion medium remain to be dispersed in the resin layer after curing of the resin composition. When a reactive dispersion medium is used, the inorganic oxide particles are mixed with the dispersion medium in the resin composition and are incorporated in the resin layer with the dispersion condition maintained. When a non-reactive dispersion medium is used, at least a part of the dispersion medium evaporates and disappears from the resin composition, but the inorganic oxide particles remain in the resin composition with the dispersion condition remained and are also present in the cured resin layer with the dispersion condition remained. Electron microscope observation shows that the inorganic oxide particles present in the resin layer are in the condition of dispersion of the primary particle.

Due to excellent dispersion properties in the resin composition and easy formation of a tough resin layer, it is preferable that the inorganic oxide particles are particles including at least one selected from the group consisting of silicon dioxide (silica), zirconium dioxide (zirconia), aluminum oxide (alumina), magnesium oxide (magnesia), titanium oxide (titania), tin oxide, and zinc oxide. From the viewpoint of excellent inexpensiveness, easy surface treatment, permeability to ultraviolet ray, easy provision of a resin layer with appropriate hardness, and the like, it is more preferable that the hydrophobic silica particles be used as the inorganic oxide particles according to the present embodiment.

From the viewpoint of imparting appropriate toughness to the secondary resin layer, the average primary particle size of the inorganic oxide particles may be 500 nm or less, is preferably 200 nm or less, more preferably 100 nm or less, and further preferably 50 nm or less. From the viewpoint of increasing the Young's modulus of the secondary resin layer, the average primary particle size of the inorganic oxide particles is preferably 1 nm or more, more preferably 5 nm or more, and further preferably 10 nm or more. The average primary particle diameter can be measured with image analysis of electron microscope pictures, a light scattering method or a BET method, for example. The dispersion medium in which the primary particle of the inorganic oxide is dispersed appears to be visually transparent when the diameter of the primary particle is small. When the diameter of the primary particle diameter is relatively large (40 nm or more), the dispersion medium in which the primary particle is dispersed appears to be clouded, but the precipitate is not observed.

The content of the inorganic oxide particles is preferably 1% by mass or more and 60% by mass or less, more preferably 5% by mass or more and 55% by mass or less, further preferably 10% by mass or more and 50% by mass or less, and particularly preferably 20% by mass or more and 45% by mass or less based on the total amount of the photopolymerizable compound and inorganic oxide particles. The content of the inorganic oxide particles of 1% by mass or more allows easy increase in the Young's modulus of the resin layer. The content of the inorganic oxide particles of 60% by mass or less allows easy impartment of the toughness to the resin composition.

The resin composition according to the present embodiment is preferably used as the secondary coating material for the optical fiber. An optical fiber having excellent lateral pressure characteristics and toughness can be produced by using the resin composition according to the present embodiment for the secondary resin layer.

<Optical Fiber>

FIG. 1 is a schematic cross-section diagram showing an example of the optical fiber according to the present embodiment. The optical fiber 10 comprises the glass fiber 13 including the core 11 and the cladding 12, and the coating resin layer 16 including the primary resin layer 14 provided on the outer periphery of the glass fiber 13 and the secondary resin layer 15.

The cladding 12 surrounds the core 11. The core 11 and the cladding 12 mainly include glass such as silica glass, germanium-added silica glass or pure silica glass can be used, for example, in the core 11, and pure silica glass or fluorine-added silica glass can be used in the cladding 12.

In FIG. 1, for example, the outside diameter (D2) of the glass fiber 13 is about 100 μm to 125 μm, and the diameter (D1) of the core 11 constituting the glass fiber 13 is about 7 μm to 15 μm. The thickness of the coating resin layer 16 is typically about 22 μm to 70 μm. The thickness of each of the primary resin layer 14 and the secondary resin layer 15 may be about 5 m to 50 μm.

When the outside diameter (D2) of the glass fiber 13 is about 125 μm and the thickness of the coating resin layer 16 is 60 μm or more and 70 μm or less, the thickness of each of the primary resin layer 14 and the secondary resin layer 15 may be about 10 μm to 50 μm, and for example, the thickness of the primary resin layer 14 may be 35 μm and the thickness of the secondary resin layer 15 may be 25 μm. The outside diameter of the optical fiber 10 may be about 245 μm to 265 μm.

When the outside diameter (D2) of the glass fiber 13 is about 125 μm and the thickness of the coating resin layer 16 is 27 μm or more and 48 μm or less, the thickness of each of the primary resin layer 14 and the secondary resin layer 15 may be about 10 μm to 38 μm, and for example, the thickness of the primary resin layer 14 may be 25 μm and the thickness of the secondary resin layer 15 may be 10 μm. The outside diameter of the optical fiber 10 may be about 179 μm to 221 μm.

When the outside diameter (D2) of the glass fiber 13 is about 100 μm and the thickness of the coating resin layer 16 is 22 μm or more and 37 μm or less, the thickness of each of the primary resin layer 14 and the secondary resin layer 15 may be about 5 μm to 32 μm, and for example, the thickness of the primary resin layer 14 may be 25 μm and the thickness of the secondary resin layer 15 may be 10 μm. The outside diameter of the optical fiber 10 may be about 144 μm to 174 μm.

Applying the resin composition according to the present embodiment to the secondary resin layer can produce an optical fiber having a high Young's modulus and excellent lateral pressure characteristics.

A method for manufacturing the optical fiber according to the present embodiment comprises: an application step of applying the above resin composition to the outer periphery of a glass fiber composed of a core and a cladding; and a curing step of curing the resin composition by irradiating with ultraviolet rays after the application step.

From the viewpoint of improving the lateral pressure characteristics of an optical fiber, the Young's modulus of the secondary resin layer is preferably 1200 MPa or more, more preferably 1400 MPa or more, and further preferably 1600 MPa or more at 23° C.±2° C. From the viewpoint of imparting appropriate toughness to the secondary resin layer, the Young's modulus of the secondary resin layer is preferably 3500 MPa or less, more preferably 3000 MPa or less, and further preferably 2500 MPa or less at 23° C.±2° C.

The primary resin layer 14 can be formed by curing a resin composition including a urethane (meth)acrylate, a monomer, a photopolymerization initiator and a silane coupling agent. Prior art techniques can be used for a resin composition for the primary coating. A urethane (meth) acrylate, a monomer, a photopolymerization initiator and a silane coupling agent may be appropriately selected from compounds exemplified in the above base resin. The resin composition constituting the primary resin layer has composition different from the base resin forming the secondary resin layer.

From the viewpoint of suppressing the generation of voids in the optical fiber, the Young's modulus of the primary resin layer is preferably 0.04 MPa or more and 1.0 MPa or less at 23° C.±2° C., more preferably 0.05 MPa or more and 0.9 MPa or less, and further preferably 0.05 MPa or more and 0.8 MPa or less.

A plurality of optical fibers is arranged in parallel and integrated with a ribbon resin to form an optical fiber ribbon. The resin composition according to the present disclosure can also be used as a ribbon resin. This can improve the lateral pressure characteristics and toughness of the optical fiber ribbon as in the case of the optical fiber.

EXAMPLES

Hereinafter, the results of evaluation test using Examples and Comparative Examples according to the present disclosure will be shown, and the present disclosure is described in more detail. The present invention is not limited to these examples.

(Urethane Acrylate)

A urethane acrylate (UA-1) was obtained by reacting polypropylene glycol with a Mn of 2000, 2,4-tolylene diisocyanate, and hydroxyethyl acrylate.

A urethane acrylate (UA-2) was obtained by reacting polypropylene glycol with a Mn of 4000, isophorone diisocyanate, hydroxyethyl acrylate, and methanol.

(Aliphatic epoxy acrylate) As the aliphatic epoxy acrylates, an epoxy acrylate (EA-1) mainly including a compound represented by the formula (1) wherein $R^1$ is a hydrogen atom and n is 1; an epoxy acrylate (EA-2) mainly including a compound represented by the formula (1) wherein $R^1$ is a hydrogen atom and n is 3; an epoxy acrylate (EA-3) mainly including a compound represented by the formula (1) wherein $R^1$ is a hydrogen atom and the average value of n is about 7; an epoxy acrylate (EA-4) mainly including a compound represented by the formula (2) wherein $R^2$ is a hydrogen atom and m is 1; an epoxy acrylate (EA-5) mainly including a compound represented by the formula (2) wherein $R^2$ is a hydrogen atom and m is 2; an epoxy acrylate (EA-6) mainly including a compound represented by the formula (2) wherein $R^2$ is a hydrogen atom and m is about 4; and an epoxy acrylate (EA-7) mainly including a compound represented by the formula (2) wherein $R^2$ is a hydrogen atom and m is about 9 were prepared.

(Epoxy Acrylate Having Aromatic Ring)

An epoxy acrylate of bisphenol A type (EA-8) was prepared as an epoxy acrylate having an aromatic ring.

(Monomer)

Tripropylene glycol diacrylate (TPGDA) was prepared as a multifunctional monomer, and 2-phenoxyethyl acrylate (PO-A) was prepared as a monofunctional monomer.

(Photopolymerization Initiator)

As the photopolymerization initiator, 1-hydroxycyclohexyl phenyl ketone (Omnirad 184) and 2,4,6-trimethylbenzoyldiphenylphosphine oxide (Omnirad TPO) were prepared.

(Inorganic Oxide Particles)

Silica sol having hydrophobic silica particles having a methacryloyl group and with an average primary particle size of 10 to 20 nm, dispersed in MEK was prepared as the inorganic oxide particles.

[Resin Composition for Secondary Coating]

A urethane acrylate, an epoxy acrylate, a monomer, and a photopolymerization initiator were mixed in the blending amount (% by mass) shown in Table 1 or Table 2 to prepare a base resin. Next, the silica sol was mixed with the base resin so as to have the content of the silica particles shown in Table 1 or Table 2, and then most of MEK as a dispersion medium was removed under reduced pressure to produce resin compositions of Examples and Comparative Examples. The content of remaining MEK in the resin composition was 5% by mass or less.

In Table 1 and Table 2, the values of the urethane acrylate, the epoxy acrylate, and the monomer are the content (% by mass) based on the total amount of the photopolymerizable compound, and the value of the silica particles is the content (% by mass) based on the total amount of the photopolymerizable compound and the silica particles.

(Young's Modulus)

The resin composition obtained in the examples or comparative examples was applied onto a polyethylene terephthalate (PET) film by using a spin coater, and then cured by using an electrodeless UV lamp system ("VPS 600 (D valve)" manufactured by Heraeus) at a condition of 1000±100 mJ/cm² to form a resin layer having a thickness of 200±20 μm on the PET film. The resin layer was peeled off from the PET film to obtain a resin film.

The resin film was punched into a dumbbell shape of JIS K 7127 type 5 and pulled under the condition of 23±2° C. and 50±10% RH by using a tensile tester at a tension speed of 1 mm/min and a distance between marked lines of 25 mm, and a stress-strain curve was obtained. Young's modulus was determined by 2.5% secant line.

(Breaking Elongation)

A resin layer having a thickness of 50±5 μm was formed on the PET film by the same operation as in the production of the above resin film. The resin layer was peeled off from the PET film to obtain a resin film. The resin film was punched into a dumbbell shape of JIS Z 6251 type 3 and pulled under the condition of 23±2° C. and 50±10% RH by using a material tensile tester, type 5985, manufactured by Instron Corporation at a tension speed of 1 mm/min. For strain measurement, breaking elongation was measured with a high precision video extensometer, AVE, manufactured by Instron Corporation.

(Toughness)

A 1000 m bundle of an optical fiber was immersed for 30 days in mineral oil that had been heated to 85° C., and then the transmission loss of light having a wavelength of 1550 nm was measured by the OTDR method. A case where the difference between the transmission loss before immersion in mineral oil and the transmission loss after immersion was 0.04 dB/km or less was evaluated as "A", and a case where the difference was more than 0.04 dB/km was evaluated as "B". Lowered toughness easily results in coating cracking in a mineral oil deterioration test to increase transmission loss.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Silica particles | 38.0 | 38.0 | 38.0 | 38.0 | 38.0 | 38.0 | 38.0 | 38.0 | 38.0 | 38.0 | 38.0 |
| UA-1 | 14.8 | 14.3 | 13.8 | 13.8 | 13.8 | 13.8 | 13.8 | 13.8 | 13.8 | 12.8 | 10.5 |
| EA-1 | — | — | — | 8.0 | — | — | — | — | — | — | — |
| EA-2 | 1.5 | 5.0 | 8.0 | — | — | — | — | — | — | 15.0 | 30.0 |
| EA-3 | — | — | — | — | 8.0 | — | — | — | — | — | — |
| EA-4 | — | — | — | — | — | 8.0 | — | — | — | — | — |
| EA-5 | — | — | — | — | — | — | 8.0 | — | — | — | — |
| EA-6 | — | — | — | — | — | — | — | 8.0 | — | — | — |
| EA-7 | — | — | — | — | — | — | — | — | 8.0 | — | — |
| EA-8 | 44.3 | 42.8 | 41.4 | 41.4 | 41.4 | 41.4 | 41.4 | 41.4 | 41.4 | 38.3 | 31.5 |
| TPGDA | 29.6 | 28.5 | 27.6 | 27.6 | 27.6 | 27.6 | 27.6 | 27.6 | 27.6 | 25.5 | 21.0 |
| PO-A | 9.9 | 9.5 | 9.2 | 9.2 | 9.2 | 9.2 | 9.2 | 9.2 | 9.2 | 8.5 | 7.0 |
| Omnirad 184 | 0.5 | 0.5 | 0.5 | 0.5 | 0.5 | 0.5 | 0.5 | 0.5 | 0.5 | 0.5 | 0.5 |
| Omnirad TPO | 0.5 | 0.5 | 0.5 | 0.5 | 0.5 | 0.5 | 0.5 | 0.5 | 0.5 | 0.5 | 0.5 |
| Young's modulus (MPa) | 1850 | 1900 | 2000 | 2100 | 1900 | 2100 | 2050 | 2000 | 1900 | 2100 | 2200 |
| Breaking elongation (%) | 5 | 10 | 14 | 12 | 15 | 12 | 13 | 14 | 15 | 15 | 15 |
| Lateral pressure characteristics | A | A | A | A | A | A | A | A | A | A | A |
| Toughness | A | A | A | A | A | A | A | A | A | A | A |

[Production of an Optical Fiber]

75 parts by mass of UA-2, 12 parts by mass of a nonylphenol EO-modified acrylate, 6 parts by mass of N-vinylcaprolactam, 2 parts by mass of 1,6-hexanediol diacrylate, 1 part by mass of Omnirad TPO, and 1 part by mass of 3-mercaptopropyltrimethoxysilane were mixed to obtain a resin composition for the primary coating.

The resin composition for the primary resin layer and the resin composition of Examples or Comparative Examples for the secondary resin layer were applied to the outer periphery of a 125 jm diameter glass fiber composed of a core and a cladding, and then the resin composition was cured by irradiating with ultraviolet rays and a primary resin layer with a thickness of 35 μm and a secondary resin layer with a thickness of 25 μm around the outer periphery thereof were formed to produce an optical fiber.

(Lateral Pressure Characteristics)

The transmission loss of light having a wavelength of 1550 nm when the optical fiber was wound into a single layer onto a bobbin with its surface covered with sandpaper and having a diameter of 280 mm was measured by an OTDR (Optical Time Domain Reflectometer) method. In addition, the transmission loss of light having a wavelength of 1550 nm when the optical fiber was wound into a single layer on a bobbin having a diameter of 280 mm without sandpaper was measured by the OTDR method. Difference in the measured transmission loss was obtained and the lateral pressure characteristics was evaluated as "A" when the transmission loss difference was 0.6 dB/km or less, and the lateral pressure characteristics was evaluated as "B" when the transmission loss difference was over 0.6 dB/km.

TABLE 2

| | Comparative Example | | |
|---|---|---|---|
| | 1 | 2 | 3 |
| Silica particles | — | 38.0 | 38.0 |
| UA-1 | 15.0 | 15.0 | 7.5 |
| EA-2 | — | — | 50.0 |
| EA-8 | 45.0 | 45.0 | 22.5 |
| TPGDA | 30.0 | 30.0 | 15.0 |
| PO-A | 10.0 | 10.0 | 5.0 |
| Omnirad 184 | 0.5 | 0.5 | 0.5 |
| Omnirad TPO | 0.5 | 0.5 | 0.5 |
| Young's modulus (MPa) | 1000 | 1800 | 2100 |
| Breaking elongation (%) | 20 | 1 | 2 |
| Lateral pressure characteristics | A | B | B |
| Toughness | A | B | B |

REFERENCE SIGNS LIST

10: Optical fiber, 11: Core, 12: Cladding, 13: Glass fiber, 14: Primary resin layer, 15: Secondary resin layer, 16: Coating resin layer.

The invention claimed is:

1. A resin composition for coating a secondary resin layer of an optical fiber, comprising:
    a base resin comprising a photopolymerizable compound and a photopolymerization initiator; and
    hydrophobic inorganic oxide particles,
    wherein the photopolymerizable compound comprises urethane (meth)acrylate, aliphatic epoxy (meth)acrylate, and epoxy (meth)acrylate having an aromatic ring, and a content of the aliphatic epoxy (meth)acrylate is 1.0% by mass or more and 45% by mass or less based on a total amount of the photopolymerizable compound, and a content of the hydrophobic inorganic oxide particles is 10% by mass or more and 60% by mass or less based on a total amount of the photopolymerizable compound and inorganic oxide particles.

2. The resin composition according to claim 1, wherein the aliphatic epoxy (meth)acrylate has an ethylene oxide group or a propylene oxide group.

3. The resin composition according to claim 2, wherein the inorganic oxide particles are particles comprising at least one selected from the group consisting of silicon dioxide, zirconium dioxide, aluminum oxide, magnesium oxide, titanium oxide, tin oxide, and zinc oxide.

4. The resin composition according to claim 1, wherein the inorganic oxide particles are particles comprising at least one selected from the group consisting of silicon dioxide, zirconium dioxide, aluminum oxide, magnesium oxide, titanium oxide, tin oxide, and zinc oxide.

5. An optical fiber comprising:
a glass fiber comprising a core and a cladding;
a primary resin layer being in contact with the glass fiber and coating the glass fiber; and
a secondary resin layer coating the primary resin layer,
wherein the secondary resin layer comprises a cured product of the resin composition according to claim 1.

6. A method for manufacturing an optical fiber, comprising:
an application step of applying the resin composition according to claim 1 to an outer periphery of a glass fiber composed of a core and a cladding; and
a curing step of curing the resin composition by irradiating with ultraviolet rays after the application step.

7. The resin composition according to claim 1, wherein the content of the hydrophobic inorganic oxide particles is 20% by mass or more and 60% by mass or less based on a total amount of the photopolymerizable compound and inorganic oxide particles.

* * * * *